US012169079B2

(12) United States Patent
Everly et al.

(10) Patent No.: US 12,169,079 B2
(45) Date of Patent: *Dec. 17, 2024

(54) HEATER BUNDLE FOR ADAPTIVE CONTROL

(71) Applicant: Watlow Electric Manufacturing Company, St. Louis, MO (US)

(72) Inventors: Mark Everly, St. Charles, MO (US); Louis P. Steinhauser, St. Louis, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 497 days.

This patent is subject to a terminal disclaimer.

(21) Appl. No.: 16/278,910

(22) Filed: Feb. 19, 2019

(65) Prior Publication Data

US 2019/0178530 A1 Jun. 13, 2019

Related U.S. Application Data

(60) Continuation of application No. 15/907,595, filed on Feb. 28, 2018, now Pat. No. 10,260,776, which is a (Continued)

(51) Int. Cl.
*F24H 9/20* (2022.01)
*F24H 1/10* (2022.01)
(Continued)

(52) U.S. Cl.
CPC .......... *F24H 9/2028* (2013.01); *F24H 1/103* (2013.01); *F24H 15/20* (2022.01); *F24H 15/37* (2022.01);
(Continued)

(58) Field of Classification Search
CPC .......... F24H 9/2028; F24H 1/103; F24H 1/10; F24H 1/101; F24H 1/102; F24H 9/0005;
(Continued)

(56) References Cited

U.S. PATENT DOCUMENTS 3,340,382 A * 9/1967 Lennox .................... H05B 3/48 219/544
3,582,616 A 6/1971 Wrob
(Continued)

FOREIGN PATENT DOCUMENTS

CN 1639519 A 7/2005
CN 101142852 3/2008
(Continued)

OTHER PUBLICATIONS

European Search Report issued in corresponding EP Application 20182945, completed Oct. 13, 2020.

*Primary Examiner* — Sang Y Paik
(74) *Attorney, Agent, or Firm* — Burris Law, PLLC

(57) ABSTRACT

A method of controlling a heating system includes providing at least one heater assembly having a plurality of heater units, each heater unit defining an independently controlled heating zone, supplying power to the independently controlled heating zones through a plurality of power conductors that are electrically connected to each of the independently controlled heating zones, determining a temperature, and modulating power supplied to the independently controlled heating zones through the power conductors based on the determined temperature to provide a desired power output along a length of the heater assembly.

20 Claims, 5 Drawing Sheets

Related U.S. Application Data division of application No. 15/058,838, filed on Mar. 2, 2016, now Pat. No. 10,247,445.

(51) Int. Cl.

| | |
|---|---|
| ***F24H 15/20*** | (2022.01) |
| ***F24H 15/37*** | (2022.01) |
| ***H05B 1/02*** | (2006.01) |
| ***H05B 3/04*** | (2006.01) |
| ***H05B 3/48*** | (2006.01) |
| ***H05B 3/82*** | (2006.01) |
| *F24H 15/128* | (2022.01) |
| *F24H 15/25* | (2022.01) |

(52) U.S. Cl.

CPC ............. *H05B 1/0283* (2013.01); *H05B 3/04* (2013.01); *H05B 3/48* (2013.01); *H05B 3/82* (2013.01); *F24H 15/128* (2022.01); *F24H 15/25* (2022.01); *H05B 2203/014* (2013.01)

(58) Field of Classification Search

CPC ........ F24H 9/00; F24H 9/1809; F24H 9/1818; F24H 9/1854; F24H 9/1863; F24H 9/2007; F24H 9/2014; F24H 9/2071; F24H 9/2064; F24H 2250/00; F24H 2250/02; H05B 1/0283; H05B 3/04; H05B 3/48; H05B 3/82; H05B 2203/014; H05B 1/02

USPC ........................ 219/483, 486, 485, 494, 497; 392/479–490, 365

See application file for complete search history.

(56) References Cited

U.S. PATENT DOCUMENTS

| | | | | | |
|---|---|---|---|---|---|
| 3,673,385 | A * | 6/1972 | Drugmand | F24H 9/1818 338/315 |
| 4,039,995 | A | 8/1977 | Walton et al. | |
| 4,090,062 | A | 5/1978 | Phillips et al. | |
| 4,319,127 | A * | 3/1982 | Lindstrom | H05B 3/48 219/535 |
| 5,013,890 | A * | 5/1991 | Gamble | H05B 3/82 219/523 |
| 5,023,430 | A | 6/1991 | Brekkestran et al. | |
| 5,105,067 | A * | 4/1992 | Brekkestran | G05D 23/2401 2/69 |
| 5,280,422 | A | 1/1994 | Moe et al. | |
| 6,946,626 | B2 * | 9/2005 | Hirayama | H05B 1/023 219/492 |
| 7,372,007 | B1 | 5/2008 | McClanahan et al. | |
| 7,932,480 | B2 * | 4/2011 | Gu | G05D 23/22 219/482 |
| 9,123,755 | B2 | 9/2015 | Swanson et al. | |
| 10,386,821 | B2 * | 8/2019 | Musselman | G05D 23/2401 2/69 |
| 2004/0039487 | A1 | 2/2004 | Fennewald et al. | |
| 2004/0112893 | A1 * | 6/2004 | Okuda | H05B 3/48 219/544 |
| 2005/0249485 | A1 * | 11/2005 | Evans | F22B 1/282 392/447 |

FOREIGN PATENT DOCUMENTS

| | | | |
|---|---|---|---|
| CN | 102333391 | A | 1/2012 |
| CN | 103826482 | | 5/2014 |
| CN | 104025702 | | 9/2014 |
| CN | 105143783 | A | 12/2015 |
| DE | 202010003291 | | 8/2010 |
| EP | 1901584 | A2 | 3/2008 |
| EP | 3737206 | | 11/2020 |
| GB | 2512024 | A | 9/2014 |
| KR | 2020140004692 | | 8/2014 |
| WO | 2004019143 | | 3/2004 |
| WO | 2013033402 | | 3/2013 |
| WO | 2013034458 | | 3/2013 |

* cited by examiner

HEATER BUNDLE FOR ADAPTIVE CONTROL

CROSS-REFERENCE TO RELATED APPLICATIONS

This application is a continuation of U.S. application Ser. No. 15/907,595, filed on Feb. 28, 2018, which is a divisional of U.S. application Ser. No. 15/058,838, filed Mar. 2, 2016. The disclosures of the above applications are incorporated herein by reference.

FIELD

The present disclosure relates to electric heaters, and more particularly to heaters for heating a fluid flow such as heat exchangers.

BACKGROUND

The statements in this section merely provide background information related to the present disclosure and may not constitute prior art.

A fluid heater may be in the form of a cartridge heater, which has a rod configuration to heat fluid that flows along or past an exterior surface of the cartridge heater. The cartridge heater may be disposed inside a heat exchanger for heating the fluid flowing through the heat exchanger. If the cartridge heater is not properly sealed, moisture and fluid may enter the cartridge heater to contaminate the insulation material that electrically insulates a resistive heating element from the metal sheath of the cartridge heater, resulting in dielectric breakdown and consequently heater failure. The moisture can also cause short circuiting between power conductors and the outer metal sheath. The failure of the cartridge heater may cause costly downtime of the apparatus that uses the cartridge heater.

SUMMARY

In one form, the present disclosure provides a method of controlling a heating system that includes providing at least one heater assembly comprising a plurality of heater units in which each heater unit defines an independently controlled heating zone, supplying power to the independently controlled heating zones through a plurality of power conductors that are electrically connected to each of the independently controlled heating zones, determining a temperature, and modulating power supplied to the independently controlled heating zones through the power conductors based on the determined temperature to provide a desired power output along a length of the heater assembly.

In one variation, the method further includes comparing the determined temperatures to target temperatures and modulating the power supplied to achieve the target temperatures.

In another variation, the method further includes using a scaling factor to adjust the modulating power. In this form, the scaling factor may be used as a function of a heating capacity of each heating zone.

In a further variation, the method includes turning off at least one of the independently controlled heating zones based on an anomalous condition.

In yet another variation, the temperature is determined in a plurality of the independently controlled heating zones. In this form, when the determined temperature in at least one of the independently controlled heating zones is deviated from a target temperature, power may be modulated to at least one other heating zone to provide the desired power output along the length of the heating assembly. Determining the temperature may include using a change in resistance of a resistive heating element of at least one of the heater units.

In still another variation, the power is modulated to the independently controlled heating zones as a function of at least one of received signals, a model, and as a function of time.

In another variation, the method further comprises calibrating the heating system. This form of calibration includes operating the heater system in at least one mode of operation, controlling the heater system to activate at least one of the plurality of independently controlled heating zones to generate a desired temperature, collecting and recording data for the at least one of the plurality of the independently controlled heating zones and the at least one mode of operation, accessing the recorded data to determine operating specifications for the heating system when the at least one of the plurality of independently controlled heating zones is turned off, and operating the heating system with the at least one of the plurality of independently controlled heating zones being turned off. In this form, the data may be selected from the group consisting of power levels and temperature information.

In another form of the present disclosure, a method of controlling a heater system is provided that includes providing a plurality of heater assemblies, more than one of the heater assemblies comprising a plurality of heater units, more than one of the heater units defining at least one independently controlled heating zone, supplying power to the independently controlled heating zones, determining a temperature, and modulating power supplied to the independently controlled heating zones based on the determined temperature to provide a desired power output along a length of the heater assemblies.

In one variation, the method further includes providing a total of m×k independently controlled heating zones, wherein the number of the heater assemblies is k, and the number of the independently controlled heating zones of each of the heater assemblies is m.

In another variation, the method further includes turning off at least one of the independently controlled heating zones while continuing to supply power to remaining independently controlled heating zones.

In another variation, temperature is determined within at least one of the independently controlled heating zones and power is modulated based on the determined temperature within the independently controlled heating zone. In this form, the method may further include comparing the detected temperature to a target temperature and modulating the power supplied to achieve the target temperature.

In other variations, the method further includes using a scaling factor to adjust the modulating power, and/or the power supplied to the plurality of independently controlled heating zones is varied based on a predetermined heat distribution across the heater system.

In yet another form of the present disclosure, a method of controlling a heater system is provided that includes providing a plurality of heater assemblies, more than one of the heater assemblies comprising a plurality of heater units, more than one of the heater units defining at least one independently controlled heating zone, supplying power to the independently controlled heating zones, determining at least one of heating conditions and heating requirements, and modulating power supplied to the independently controlled heating zones based on the at least one of heating conditions and heating requirements to provide a desired power output along a length of the heater assemblies.

In another form of the present disclosure, a method of controlling a heating system is provided that includes providing at least one heater assembly, the heater assembly comprising a plurality of heater units, more than one of the heater units defining an independently controlled heating zone, supplying power to the independently controlled heating zones through a plurality of power conductors, the power conductors electrically connected to each of the independently controlled heating zones, determining at least one of heating conditions and heating requirements, and modulating power supplied to the independently controlled heating zones through the power conductors based on the at least one of heating conditions and heating requirements to provide a desired power output along a length of the heater assembly.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
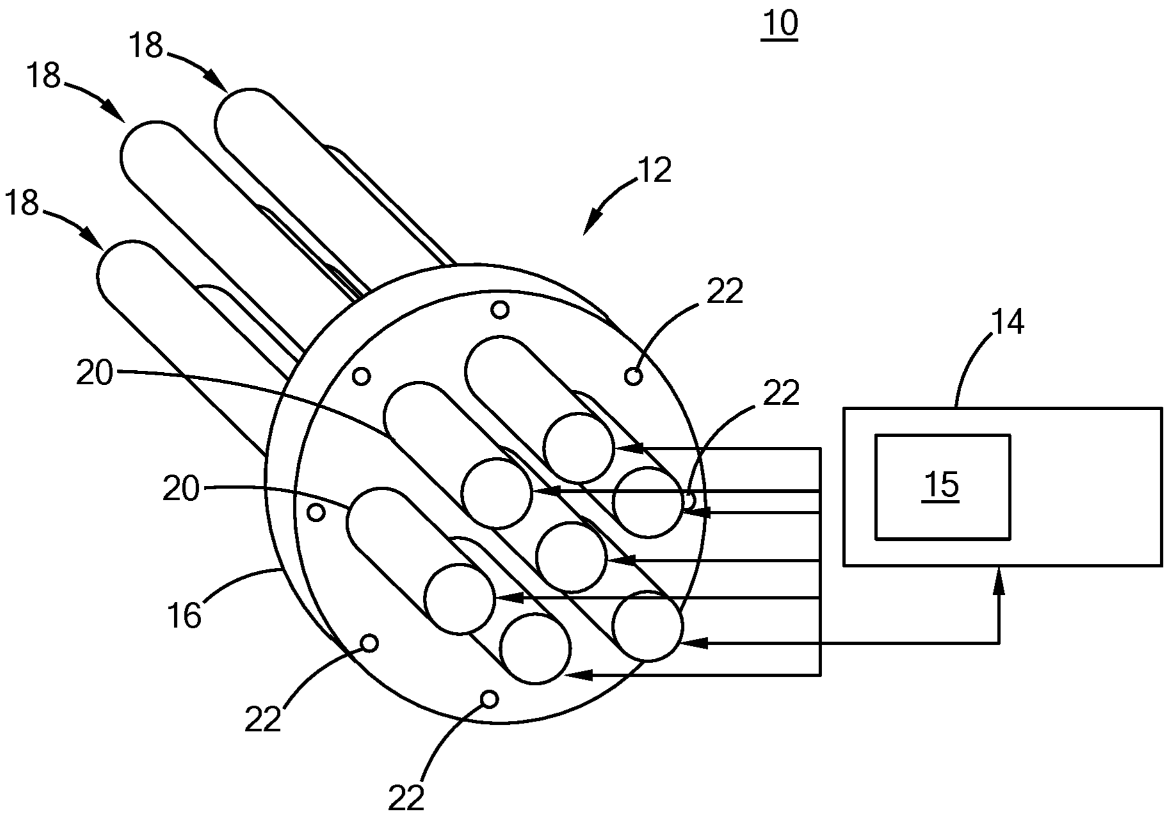
FIG. 1 is a perspective view of a heater bundle constructed in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a heater system constructed in accordance with the teachings of the present disclosure is generally indicated by reference 10. The heater system 10 includes a heater bundle 12 and a power supply device 14 electrically connected to the heater bundle 12. The power supply device 14 includes a controller 15 for controlling power supply to the heater bundle 12. A "heater bundle", as used in the present disclosure, refers to a heater apparatus including two or more physically distinct heating devices that can be independently controlled. Therefore, when one of the heating devices in the heater bundle fails or degrades, the remaining heating devices in the heater bundle 12 can continue to operate.

In one form, the heater bundle 12 includes a mounting flange 16 and a plurality of heater assemblies 18 secured to the mounting flange 16. The mounting flange 16 includes a plurality of apertures 20 through which the heater assemblies 18 extend. Although the heater assemblies 18 are arranged to be parallel in this form, it should be understood that alternate positions/arrangements of the heater assemblies 18 are within the scope of the present disclosure.

As further shown, the mounting flange 16 includes a plurality of mounting holes 22. By using screws or bolts (not shown) through the mounting holes 22, the mounting flange 16 may be assembled to a wall of a vessel or a pipe (not shown) that carries a fluid to be heated. At least a portion of the heater assemblies 18 are be immersed in the fluid inside the vessel or pipe to heat the fluid in this form of the present disclosure.

Figure 2:
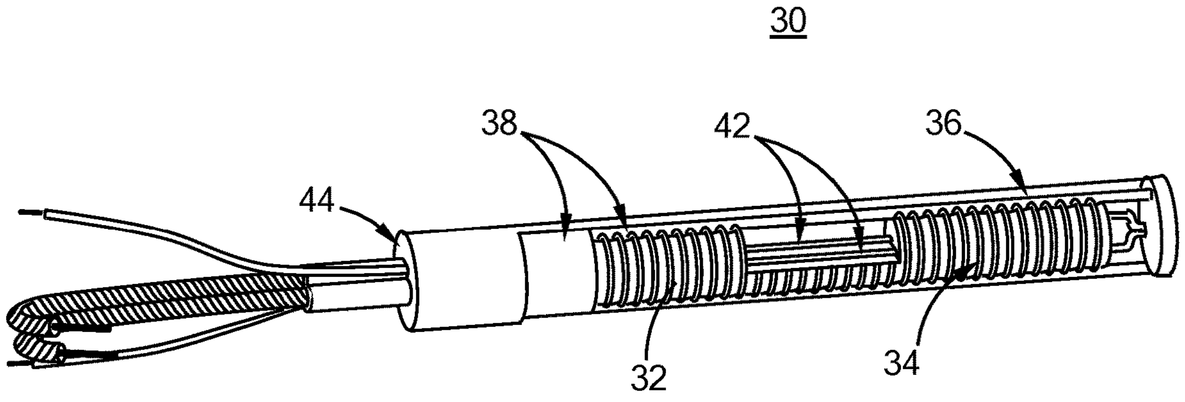
FIG. 2 is a perspective view of a heater assembly of the heater bundle of FIG. 1.

Referring to FIG. 2, the heater assemblies 18 according to one form may be in the form of a cartridge heater 30. The cartridge heater 30 is a tube-shaped heater that generally includes a core body 32, a resistive heating wire 34 wrapped around the core body 32, a metal sheath 36 enclosing the core body 32 and the resistive heating wire 34 therein, and an insulating material 38 filling in the space in the metal sheath 36 to electrically insulate the resistive heating wire 34 from the metal sheath 36 and to thermally conduct the heat from the resistive heating wire 34 to the metal sheath 36. The core body 32 may be made of ceramic. The insulation material 38 may be compacted Magnesium Oxide (MgO). A plurality of power conductors 42 extend through the core body 32 along a longitudinal direction and are electrically connected to the resistive heating wires 34. The power conductors 42 also extend through an end piece 44 that seals the outer sheath 36. The power conductors 42 are connected to the external power supply device 14 (shown in FIG. 1) to supply power from the external power supply device 14 to the resistive heating wire 32. While FIG. 2 shows only two power conductors 42 extending through the end piece 44, more than two power conductors 42 can extend through the end piece 44. The power conductors 42 may be in the form of conductive pins. Various constructions and further structural and electrical details of cartridge heaters are set forth in greater detail in U.S. Pat. Nos. 2,831,951 and 3,970,822, which are commonly assigned with the present application and the contents of which are incorporated herein by reference in their entirety. Therefore, it should be understood that the form illustrated herein is merely exemplary and should not be construed as limiting the scope of the present disclosure.

Alternatively, multiple resistive heating wires 34 and multiple pairs of power conductors 42 may be used to form multiple heating circuits that can be independently controlled to enhance reliability of the cartridge heater 30. Therefore, when one of the resistive heating wires 34 fails, the remaining resistive wires 34 may continue to generate heat without causing the entire cartridge heater 30 to fail and without causing costly machine downtime.

Figure 3:
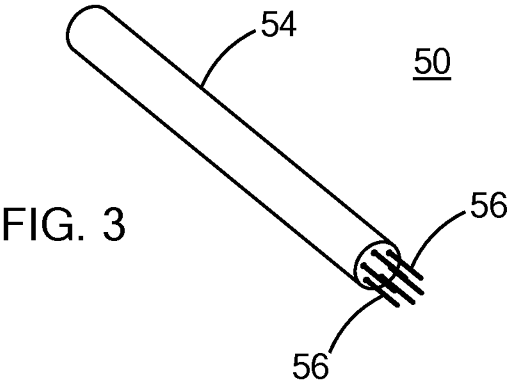
FIG. 3 is a perspective view of a variant of a heater assembly of the heater bundle of FIG. 1.
Figure 4:
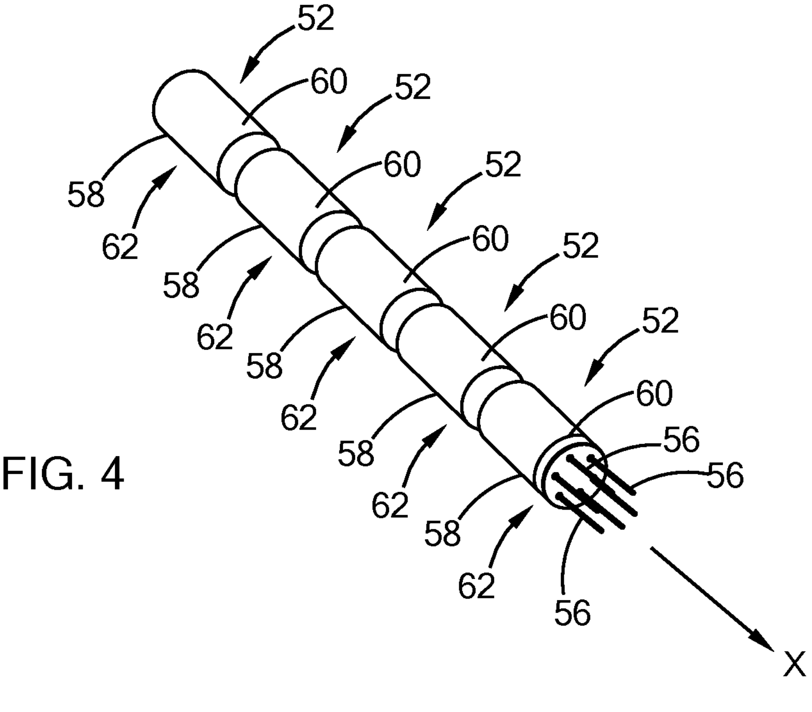
FIG. 4 is a perspective view of the heater assembly of FIG. 3, wherein the outer sheath of the heater assembly is removed for clarity.
Figure 5:
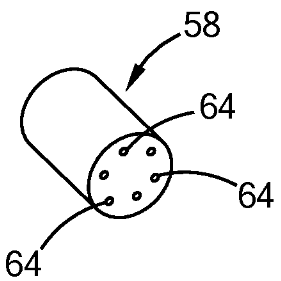
FIG. 5 is a perspective view of a core body of the heater assembly of FIG. 3.

Referring to FIGS. 3 to 5, the heater assemblies 50 may be in the form of a cartridge heater having a configuration similar to that of FIG. 2 except for the number of core bodies and number of power conductors used. More specifically, the heater assemblies 50 each include a plurality of heater units 52, and an outer metal sheath 54 enclosing the plurality of heater units 52 therein, along with a plurality of power conductors 56. An insulating material (not shown in FIGS. 3 to 5) is provided between the plurality of heating units 52 and the outer metal sheath 54 to electrically insulate the heater units 52 from the outer metal sheath 54. The plurality of heater units 52 each include a core body 58 and a resistive heating element 60 surrounding the core body 58. The resistive heating element 60 of each heater unit 52 may define one or more heating circuits to define one or more heating zones 62.

In the present form, each heater unit 52 defines one heating zone 62 and the plurality of heater units 52 in each heater assembly 50 are aligned along a longitudinal direction X. Therefore, each heater assembly 50 defines a plurality of heating zones 62 aligned along the longitudinal direction X. The core body 58 of each heater unit 52 defines a plurality of through holes/apertures 64 to allow power conductors 56 to extend therethrough. The resistive heating elements 60 of the heater units 52 are connected to the power conductors 56, which, in turn, are connected to an external power supply device 14. The power conductors 56 supply the power from the power supply device 14 to the plurality of heater units 50. By properly connecting the power conductors 56 to the resistive heating elements 60, the resistive heating elements 60 of the plurality of heating units 52 can be independently controlled by the controller 15 of the power supply device 14. As such, failure of one resistive heating element 60 for a particular heating zone 62 will not affect the proper functioning of the remaining resistive heating elements 60 for the remaining heating zones 62. Further, the heater units 52 and the heater assemblies 50 may be interchangeable for ease of repair or assembly.

In the present form, six power conductors 56 are used for each heater assembly 50 to supply power to five independent electrical heating circuits on the five heater units 52. Alternatively, six power conductors 56 may be connected to the resistive heating elements 60 in a way to define three fully independent circuits on the five heater units 52. It is possible to have any number of power conductors 56 to form any number of independently controlled heating circuits and independently controlled heating zones 62. For example, seven power conductors 56 may be used to provide six heating zones 62. Eight power conductors 56 may be used to provide seven heating zones 62.

The power conductors 56 may include a plurality of power supply and power return conductors, a plurality of power return conductors and a single power supply conductor, or a plurality of power supply conductors and a single power return conductor. If the number of heater zones is n, the number of power supply and return conductors is n+1.

Alternatively, a higher number of electrically distinct heating zones 62 may be created through multiplexing, polarity sensitive switching and other circuit topologies by the controller 15 of the external power supply device 14. Use of multiplexing or various arrangements of thermal arrays to increase the number of heating zones within the cartridge heater 50 for a given number of power conductors (e.g. a cartridge heater with six power conductors for 15 or 30 zones.) is disclosed in U.S. Pat. Nos. 9,123,755, 9,123,756, 9,177,840, 9,196,513, and their related applications, which are commonly assigned with the present application and the contents of which are incorporated herein by reference in their entirety.

With this structure, each heater assembly 50 includes a plurality of heating zones 62 that can be independently controlled to vary the power output or heat distribution along the length of the heater assembly 50. The heater bundle 12 includes a plurality of such heater assemblies 50. Therefore, the heater bundle 12 provides a plurality of heating zones 62 and a tailored heat distribution for heating the fluid that flows through the heater bundle 12 to be adapted for specific applications. The power supply device 14 can be configured to modulate power to each of the independently controlled heating zones 62.

For example, a heating assembly 50 may define an "m" heating zones, and the heater bundle may include "k" heating assemblies 50. Therefore, the heater bundle 12 may define m×k heating zones. The plurality of heating zones 62 in the heater bundle 12 can be individually and dynamically controlled in response to heating conditions and/or heating requirements, including but not limited to, the life and the reliability of the individual heater units 52, the sizes and costs of the heater units 52, local heater flux, characteristics and operation of the heater units 52, and the entire power output.

Each circuit is individually controlled at a desired temperature or a desired power level so that the distribution of temperature and/or power adapts to variations in system parameters (e.g. manufacturing variation/tolerances, changing environmental conditions, changing inlet flow conditions such as inlet temperature, inlet temperature distribution, flow velocity, velocity distribution, fluid composition, fluid heat capacity, etc.). More specifically, the heater units 52 may not generate the same heat output when operated under the same power level due to manufacturing variations as well as varied degrees of heater degradation over time. The heater units 52 may be independently controlled to adjust the heat output according to a desired heat distribution. The individual manufacturing tolerances of components of the heater system and assembly tolerances of the heater system are increased as a function of the modulated power of the power supply, or in other words, because of the high fidelity of heater control, manufacturing tolerance of individual components need not be as tight/narrow.

The heater units 52 may each include a temperature sensor (not shown) for measuring the temperature of the heater units 52. When a hot spot in the heater units 52 is detected, the power supply device 14 may reduce or turn off the power to the particular heater unit 52 on which the hot spot is detected to avoid overheating or failure of the particular heater unit 52. The power supply device 14 may modulate the power to the heater units 52 adjacent to the disabled heater unit 52 to compensate for the reduced heat output from the particular heater unit 52.

The power supply device 14 may include multi-zone algorithms to turn off or turn down the power level delivered to any particular zone, and to increase the power to the heating zones adjacent to the particular heating zone that is disabled and has a reduced heat output. By carefully modulating the power to each heating zone, the overall reliability of the system can be improved. By detecting the hot spot and controlling the power supply accordingly, the heater system 10 has improved safety.

The heater bundle 12 with the multiple independently controlled heating zones 62 can accomplish improved heating. For example, some circuits on the heater units 52 may be operated at a nominal (or "typical") duty cycle of less than 100% (or at an average power level that is a fraction of the power that would be produced by the heater with line voltage applied). The lower duty cycles allow for the use of resistive heating wires with a larger diameter, thereby improving reliability.

Normally, smaller zones would employ a finer wire size to achieve a given resistance. Variable power control allows a larger wire size to be used, and a lower resistance value can be accommodated, while protecting the heater from overloading with a duty cycle limit tied to the power dissipation capacity of the heater.

The use of a scaling factor may be tied to the capacity of the heater units 52 or the heating zone 62. The multiple heating zones 62 allow for more accurate determination and control of the heater bundle 12. The use of a specific scaling factor for a particular heating circuit/zone will allow for a more aggressive (i.e. higher) temperature (or power level) at almost all zones, which, in turn, lead to a smaller, less costly design for the heater bundle 12. Such a scaling factor and method is disclosed in U.S. Pat. No. 7,257,464, which is commonly assigned with the present application and the contents of which are incorporated herein by reference in its entirety.

The sizes of the heating zones controlled by the individual circuits can be made equal or different to reduce the total number of zones needed to control the distribution of temperature or power to a desired accuracy.

Referring back to FIG. 1, the heater assemblies 18 are shown to be a single end heater, i.e., the conductive pin extends through only one longitudinal end of the heater assemblies 18. The heater assembly 18 may extend through the mounting flange 16 or a bulkhead (not shown) and sealed to the flange 16 or bulkhead. As such, the heater assemblies 18 can be individually removed and replaced without removing the mounting flange 16 from the vessel or tube.

Alternatively, the heater assembly 18 may be a “double ended” heater. In a double-ended heater, the metal sheath are bent into a hairpin shape and the power conductors pass through both longitudinal ends of the metal sheath so that both longitudinal ends of the metal sheath pass through and are sealed to the flange or bulkhead. In this structure, the flange or the bulkhead need to be removed from the housing or the vessel before the individual heater assembly 18 can be replaced.

Figure 6:
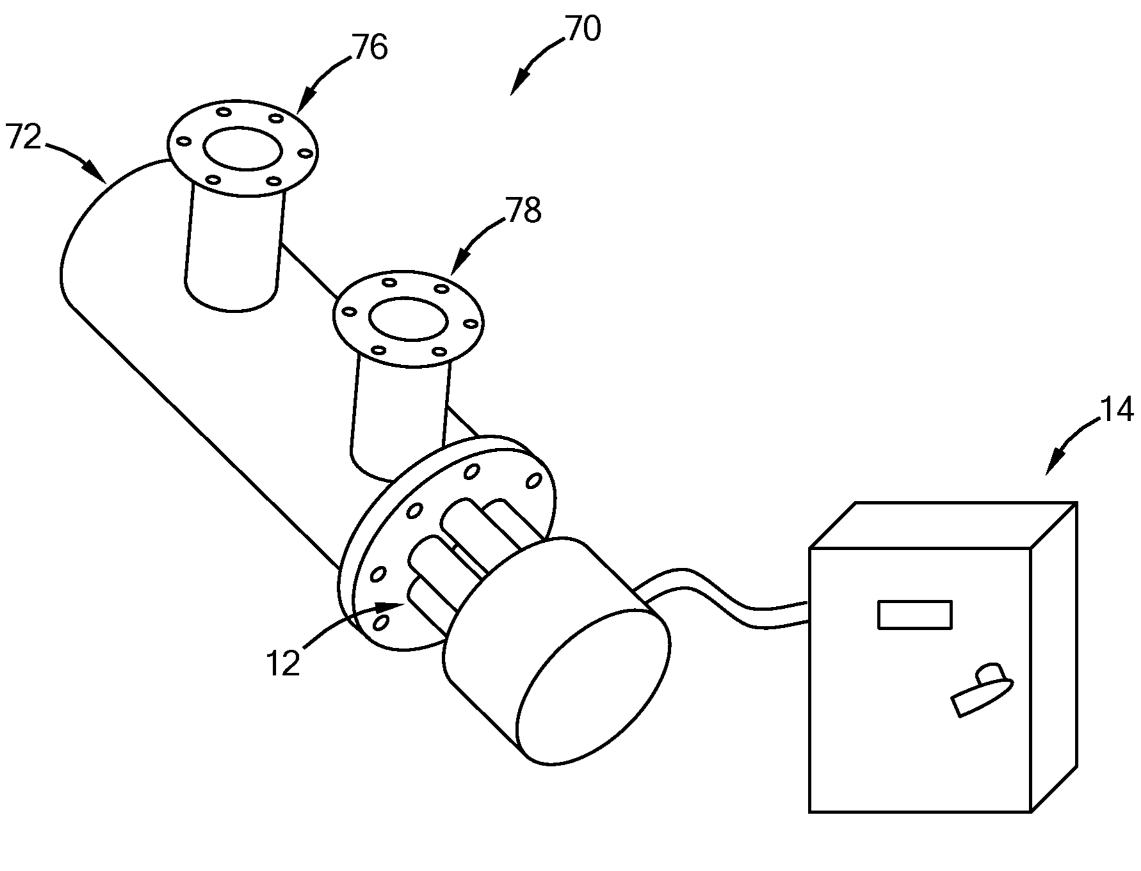
FIG. 6 is a perspective view of a heat exchanger including the heater bundle of FIG. 1, wherein the heater bundle is partially disassembled from the heat exchanger to expose the heater bundle for illustration purposes.

Referring to FIG. 6, a heater bundle 12 is incorporated in a heat exchanger 70. The heat exchanger 70 includes a sealed housing 72 defining an internal chamber (not shown), a heater bundle 12 disposed within the internal chamber of the housing 72. The sealed housing 72 includes a fluid inlet 76 and a fluid outlet 78 through which fluid is directed into and out of the internal chamber of the sealed housing 72. The fluid is heated by the heater bundle 12 disposed in the sealed housing 72. The heater bundle 12 may be arranged for either cross-flow or for flow parallel to their length.

The heater bundle 12 is connected to an external power supply device 14 which may include a means to modulate power, such as a switching means or a variable transformer, to modulate the power supplied to an individual zone. The power modulation may be performed as a function of time or based on detected temperature of each heating zone.

The resistive heating wire may also function as a sensor using the resistance of the resistive wire to measure the temperature of the resistive wire and using the same power conductors to send temperature measurement information to the power supply device 14. A means of sensing temperature for each zone would allow the control of temperature along the length of each heater assembly 18 in the heater bundle 12 (down to the resolution of the individual zone). Therefore, the additional temperature sensing circuits and sensing means can be dispensed with, thereby reducing the manufacturing costs. Direct measurement of the heater circuit temperature is a distinct advantage when trying to maximize heat flux in a given circuit while maintaining a desired reliability level for the system because it eliminates or minimizes many of the measurement errors associated with using a separate sensor. The heating element temperature is the characteristic that has the strongest influence on heater reliability. Using a resistive element to function as both a heater and a sensor is disclosed in U.S. Pat. No. 7,196,295, which is commonly assigned with the present application and the contents of which are incorporated herein by reference in its entirety.

Alternatively, the power conductors 56 may be made of dissimilar metals such that the power conductors 56 of dissimilar metals may create a thermocouple for measuring the temperature of the resistive heating elements. For example, at least one set of a power supply and a power return conductor may include different materials such that a junction is formed between the different materials and a resistive heating element of a heater unit and is used to determine temperature of one or more zones. Use of “integrated” and “highly thermally coupled” sensing, such as using different metals for the heater leads to generation of a thermocouple-like signal. The use of the integrated and coupled power conductors for temperature measurement is disclosed in U.S. application Ser. No. 14/725,537, which is commonly assigned with the present application and the contents of which are incorporated herein by reference in its entirety.

The controller 15 for modulating the electrical power delivered to each zone may be a closed-loop automatic control system. The closed-loop automatic control system 15 receives the temperature feedback from each zone and automatically and dynamically controls the delivery of power to each zone, thereby automatically and dynamically controlling the power distribution and temperature along the length of each heater assembly 18 in the heater bundle 12 without continuous or frequent human monitoring and adjustment.

The heater units 52 as disclosed herein may also be calibrated using a variety of methods including but not limited to energizing and sampling each heater unit 52 to calculate its resistance. The calculated resistance can then be compared to a calibrated resistance to determine a resistance ratio, or a value to then determine actual heater unit temperatures. Exemplary methods are disclosed in U.S. Pat. Nos. 5,280,422 and 5,552,998, which are commonly assigned with the present application and the contents of which are incorporated herein by reference in their entirety.

One form of calibration includes operating the heater system 10 in at least one mode of operation, controlling the heater system 10 to generate a desired temperature for at least one of the independently controlled heating zones 62, collecting and recording data for the at least one independently controlled heating zones 62 for the mode of operation, then accessing the recorded data to determine operating specifications for a heating system having a reduced number of independently controlled heating zones, and then using the heating system with the reduced number of independently controlled heating zones. The data may include, by way of example, power levels and/or temperature information, among other operational data from the heater system 10 having its data collected and recorded.

In a variation of the present disclosure, the heater system may include a single heater assembly 18, rather than a plurality of heater assemblies in a bundle 12. The single heater assembly 18 would comprise a plurality of heater units 52, each heater unit 52 defining at least one independently controlled heating zone. Similarly, power conductors 56 are electrically connected to each of the independently controlled heating zones 62 in each of the heater units 62, and the power supply device is configured to modulate power to each of the independently controlled heater zones 62 of the heater units through the power conductors 56.

Figure 7:
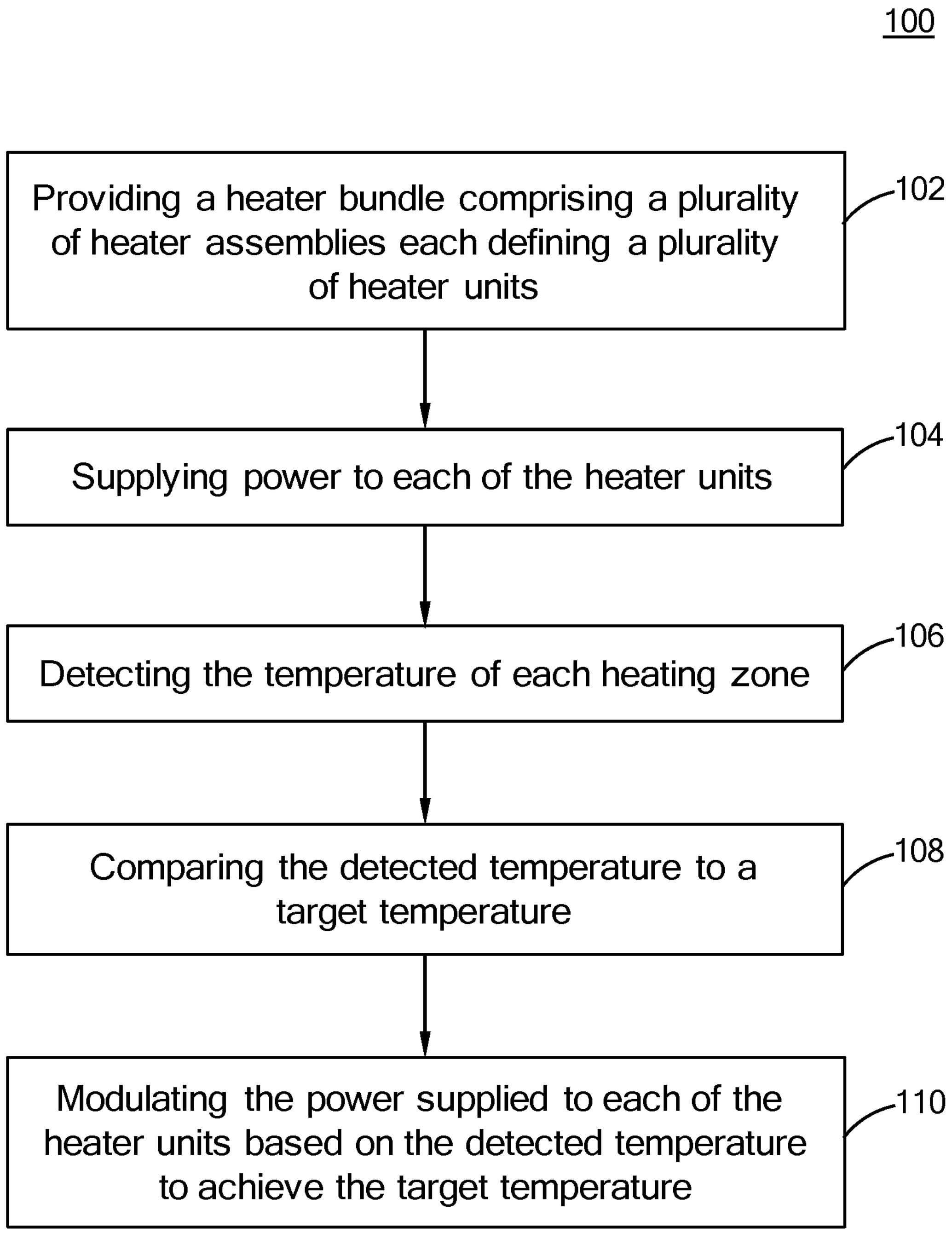
FIG. 7 is a block diagram of a method of operating a heater system including a heater bundle constructed in accordance with the teachings of the present disclosure.

Referring to FIG. 7, a method 100 of controlling a heater system includes providing a heater bundle comprising a plurality of heater assemblies in step 102. Each heater assembly includes a plurality of heater units. Each heater unit defines at least one independently controlled heating circuit (and consequently heating zone). The power to each of the heater units is supplied through power conductors electrically connected to each of the independently controlled heating zones in each of the heater units in step 104. The temperature within each of the zones is detected in step 106. The temperature may be determined using a change in resistance of a resistive heating element of at least one of the heater units. The zone temperature may be initially determined by measuring the zone resistance (or, by measurement of circuit voltage, if appropriate materials are used).

The temperature values may be digitalized. The signals may be communicated to a microprocessor. The measured (detected) temperature values may be compared to a target (desired) temperature for each zone in step 108. The power supplied to each of the heater units may be modulated based on the measured temperature to achieve the target temperatures in step 110.

Optionally, the method may further include using a scaling factor to adjust the modulating power. The scaling factor may be a function of a heating capacity of each heating zone. The controller 15 may include an algorithm, potentially including a scaling factor and/or a mathematical model of the dynamic behavior of the system (including knowledge of the update time of the system), to determine the amount of power to be provided (via duty cycle, phase angle firing, voltage modulation or similar techniques) to each zone until the next update. The desired power may be converted to a signal, which is sent to a switch or other power modulating device for controlling power output to the individual heating zones.

In the present form, when at least one heating zone is turned off due to an anomalous condition, the remaining zones continue to provide a desired wattage without failure. Power is modulated to a functional heating zone to provide a desired wattage when an anomalous condition is detected in at least one heating zone. When at least one heating zone is turned off based on the determined temperature, the remaining zones continue to provide a desired wattage. The power is modulated to each of the heating zones as a function of at least one of received signals, a model, and as a function of time.

For safety or process control reasons, typical heaters are generally operated to be below a maximum allowable temperature in order to prevent a particular location of the heater from exceeding a given temperature due to unwanted chemical or physical reactions at the particular location, such as combustion/fire/oxidation, coking boiling etc.). Therefore, this is normally accommodated by a conservative heater design (e.g., large heaters with low power density and much of their surface area loaded with a much lower heat flux than might otherwise be possible).

However, with the heater bundle of the present disclosure, it is possible to measure and limit the temperature of any location within the heater down to a resolution on the order of the size of the individual heating zones. A hot spot large enough to influence the temperature of an individual circuit can be detected.

Since the temperature of the individual heating zones can be automatically adjusted and consequently limited, the dynamic and automatic limitation of temperature in each zone will maintain this zone and all other zones to be operating at an optimum power/heat flux level without fear of exceeding the desired temperature limit in any zone. This brings an advantage in high-limit temperature measurement accuracy over the current practice of clamping a separate thermocouple to the sheath of one of the elements in a bundle. The reduced margin and the ability to modulate the power to individual zones can be selectively applied to the heating zones, selectively and individually, rather than applied to an entire heater assembly, thereby reducing the risk of exceeding a predetermined temperature limit.

The characteristics of the cartridge heater may vary with time. This time varying characteristic would otherwise require that the cartridge heater be designed for a single selected (worse-case) flow regime and therefore that the cartridge heater would operate at a sub-optimum state for other states of flow.

However, with dynamic control of the power distribution over the entire bundle down to a resolution of the core size due to the multiple heating units provided in the heater assembly, an optimized power distribution for various states of flow can be achieved, as opposed to only one power distribution corresponding to only one flow state in the typical cartridge heater. Therefore, the heater bundle of the present application allows for an increase in the total heat flux for all other states of flow.

Further, variable power control can increase heater design flexibility. The voltage can be de-coupled from resistance (to a great degree) in heater design and the heaters may be designed with the maximum wire diameter that can be fitted into the heater. It allows for increased capacity for power dissipation for a given heater size and level of reliability (or life of the heater) and allows for the size of the bundle to be decreased for a given overall power level. Power in this arrangement can be modulated by a variable duty cycle that is a part of the variable wattage controllers currently available or under development. The heater bundle can be protected by a programmable (or pre-programmed if desired) limit to the duty cycle for a given zone to prevent "overloading" the heater bundle.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of controlling a heating system comprising:

providing at least one heater assembly including an outer heating surface for heating a heating target outside the outer heating surface, the heater assembly comprising a plurality of heater units disposed along a length of the heater assembly and enclosed within the outer heating surface of the heater assembly, and a plurality of power conductors extending through the plurality of heater units, each heater unit including a resistive heating element defining an independently controlled heating zone;

supplying power to the resistive heating elements in the independently controlled heating zones through the plurality of power conductors, the power conductors electrically connected to the resistive heating element in each of the independently controlled heating zones;

determining a temperature within the independently controlled heating zones; and automatically modulating power supplied to the resistive heating element in each of the independently controlled heating zones through the power conductors in response to the determined temperature by using a controller to change a heat output of at least one of the heating zones to provide a desired heat distribution along a length of the outer heating surface of the heater assembly.

2. The method according to claim 1 further comprising comparing the determined temperatures to target temperatures and modulating the power supplied to achieve the target temperatures.

3. The method according to claim 1 further comprising using a scaling factor to adjust the modulating power.

4. The method according to claim 3 further comprising using the scaling factor as a function of a heating capacity of each heating zone.

5. The method according to claim 1 further comprising turning off at least one of the independently controlled heating zones based on an anomalous condition.

6. The method according to claim 1, wherein the temperature is determined in each of the independently controlled heating zones.

7. The method according to claim 1, wherein when the determined temperature in at least one of the independently controlled heating zones is deviated from a target temperature, power is modulated to at least one other heating zone to provide the desired heat distribution along the length of the outer heating surface of the heating assembly.

8. The method according to claim 1, wherein the determining of the temperature includes determining the temperature using a change in resistance of a resistive heating element of at least one of the heater units.

9. The method according to claim 1, wherein the power is modulated to the independently controlled heating zones as a function of at least one of received signals, a model, and as a function of time.

10. The method according to claim 1, further comprising calibrating the heating system according to the following steps:

operating the heater system in at least one mode of operation;

controlling the heater system to activate at least one of the plurality of independently controlled heating zones to generate a desired temperature;

collecting and recording data for the at least one of the plurality of independently controlled heating zones and the at least one mode of operation;

accessing the recorded data to determine operating specifications for the heating system when the at least one of the plurality of independently controlled heating zones is turned off; and operating the heating system with at least one of the plurality of independently controlled heating zones being turned off.

11. The method according to claim 10, wherein the data is selected from the group consisting of power levels and temperature information.

12. A method of controlling a heater system comprising:

providing a plurality of heater assemblies each including an outer heating surface for heating a heating target outside the outer heating surface, more than one of the heater assemblies each comprising a plurality of heater units disposed along a length of the more than one of the heater assemblies and enclosed within a respective one of the outer heating surfaces of the plurality of heater assemblies and a plurality of power conductors extending through the plurality of heater units, more than one of the heater units including at least one resistive heating element defining at least one independently controlled heating zone;

supplying power to the resistive heating elements in the independently controlled heating zones;

determining a temperature of the plurality of heater assemblies; and automatically modulating power supplied to the resistive heating elements in the independently controlled heating zones in response to the determined temperature by using a controller to reduce a heat output of at least one of the heating zones to provide a desired heat distribution along a length of the outer heating surfaces of the more than one of the heater assemblies.

13. The method according to claim 12 further comprising providing a total of m×k independently controlled heating zones, wherein the number of the heater assemblies is k, and the number of the independently controlled heating zones of each of the heater assemblies is m.

14. The method according to claim 12 further comprising turning off at least one of the independently controlled heating zones while continuing to supply power to remaining independently controlled heating zones.

15. The method according to claim 12, wherein temperature is determined within at least one of the independently controlled heating zones and power is modulated based on the determined temperature within the independently controlled heating zone.

16. The method according to claim 15 further comprising comparing the detected temperature to a target temperature and modulating the power supplied to achieve the target temperature.

17. The method according to claim 12 further comprising using a scaling factor to adjust the modulating power.

18. The method according to claim 12, wherein power supplied to the plurality of independently controlled heating zones is varied based on a predetermined heat distribution across the heater system.

19. A method of controlling a heater system comprising:

providing a plurality of heater assemblies each including an outer heating surface for heating a heating target outside the outer heating surface, more than one of the heater assemblies comprising a plurality of heater units disposed along a length of the respective ones of the more than one of the heater assemblies and enclosed within the respective one of the outer heating surfaces of the plurality of heater assemblies and a plurality of power conductors extending through the plurality of heater units, more than one of the heater units including at least one resistive heating element defining at least one independently controlled heating zone;

supplying power to the resistive heating elements in the independently controlled heating zones;

determining at least one of heating conditions and heating requirements; and automatically modulating power supplied to the resistive heating element in each of the independently controlled heating zones in response to the at least one of heating conditions and heating requirements by using a controller to change a heat output of at least one of the heating zones to provide a desired heat distribution along a length of the outer heating surfaces of the more than one of the heater assemblies.

20. A method of controlling a heating system comprising:

providing at least one heater assembly including an outer heating surface for heating a heating target outside the outer heating surface, the heater assembly comprising a plurality of heater units disposed along a length of the heater assembly and enclosed within the outer heating surface of the heater assembly, and a plurality of power conductors extending through the plurality of heater units, more than one of the heater units including a resistive heating element defining an independently controlled heating zone;

supplying power to the resistive heating element in each of the independently controlled heating zones through a plurality of power conductors, the power conductors electrically connected to the resistive heating element in each of the independently controlled heating zones;

determining at least one of heating conditions and heating requirements; and automatically modulating power supplied to the resistive heating element in each of the independently controlled heating zones through the power conductors in response to the at least one of heating conditions and heating requirements by using a controller to change a heat output of at least one of the heating zones to provide a desired heat distribution along a length of the outer heating surface of the heater assembly.

* * * * *